United States Patent [19]
Reed et al.

[11] Patent Number: 4,768,798
[45] Date of Patent: Sep. 6, 1988

[54] INTERNAL CABLE ARRANGEMENT FOR BICYCLE FRAME

[76] Inventors: Curtis H. Reed, R.D. Long La., Coburn, Pa. 16832; William D. Grove, P.O. Box 540, Lemont, Pa. 16851

[21] Appl. No.: 34,268

[22] Filed: Apr. 3, 1987

[51] Int. Cl.⁴ .................. B62K 3/04; B62K 19/04; F16C 1/00
[52] U.S. Cl. .................. 280/281 R; 74/501 F; 74/502.2; 74/502.6; 188/24.21; 188/24.22; 254/389
[58] Field of Search ............. 280/281 R, 281 LP, 279, 280/289 R, 289 H; 188/24.22, 24.21; 74/501 B, 501 F; 254/389

[56] References Cited

U.S. PATENT DOCUMENTS

| 4,102,219 | 7/1978 | Plamper | 254/389 X |
| 4,293,141 | 10/1981 | Brilando | 280/281 R |
| 4,647,060 | 3/1987 | Tomkinson | 280/281 R X |

FOREIGN PATENT DOCUMENTS

| 411083 | 6/1945 | Italy | 280/281 R |
| 432825 | 3/1948 | Italy | 280/281 R |
| 61587 | 9/1948 | Netherlands | 280/279 |
| 261528 | 8/1949 | Switzerland | 280/281 R |

Primary Examiner—John J. Love
Assistant Examiner—Mitchell J. Hill

[57] ABSTRACT

In a bicycle frame adapted for internal control cabling, at least one control cable entrance port is located through the wall of the frame at a position ahead of the steering axis, such a port providing a bend-free cable path into and through the interior of the frame. This path passes laterally between the inner wall of the frame and the outer wall of the steering tube of a front wheel fork. A range of applicable port locations permits multiple internal cables to be installed together without interference. The frame configuration and associated cable guidance elements thereby facilitated provide direct cable paths to actuated devices such as a rear brake, front derailleur and rear derailleur. Because such paths are relatively short, incur minimal cable bending, and do not require outer cable within the frame, control actuation is characterized by particularly low levels of friction and elasticity.

11 Claims, 8 Drawing Sheets

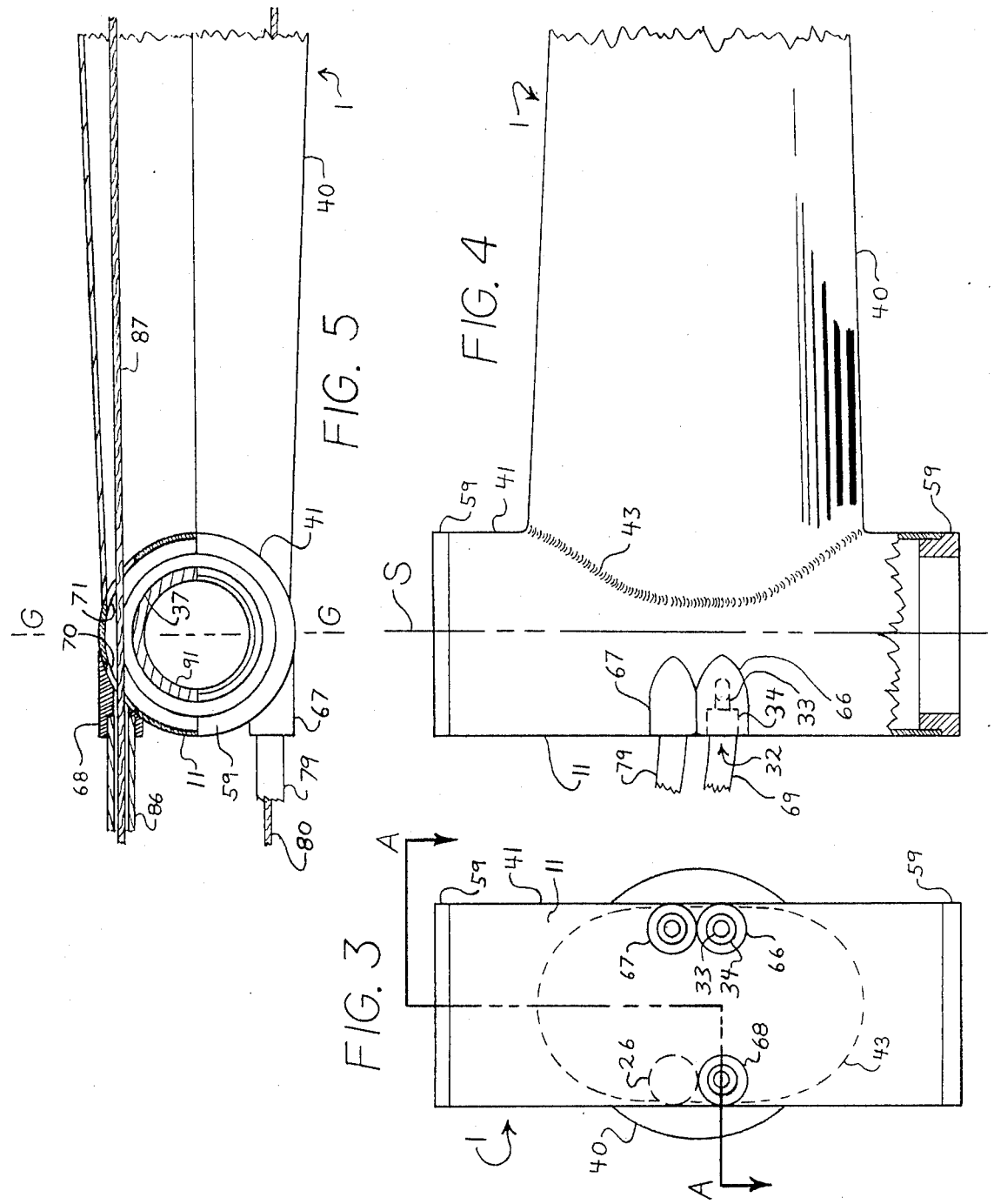

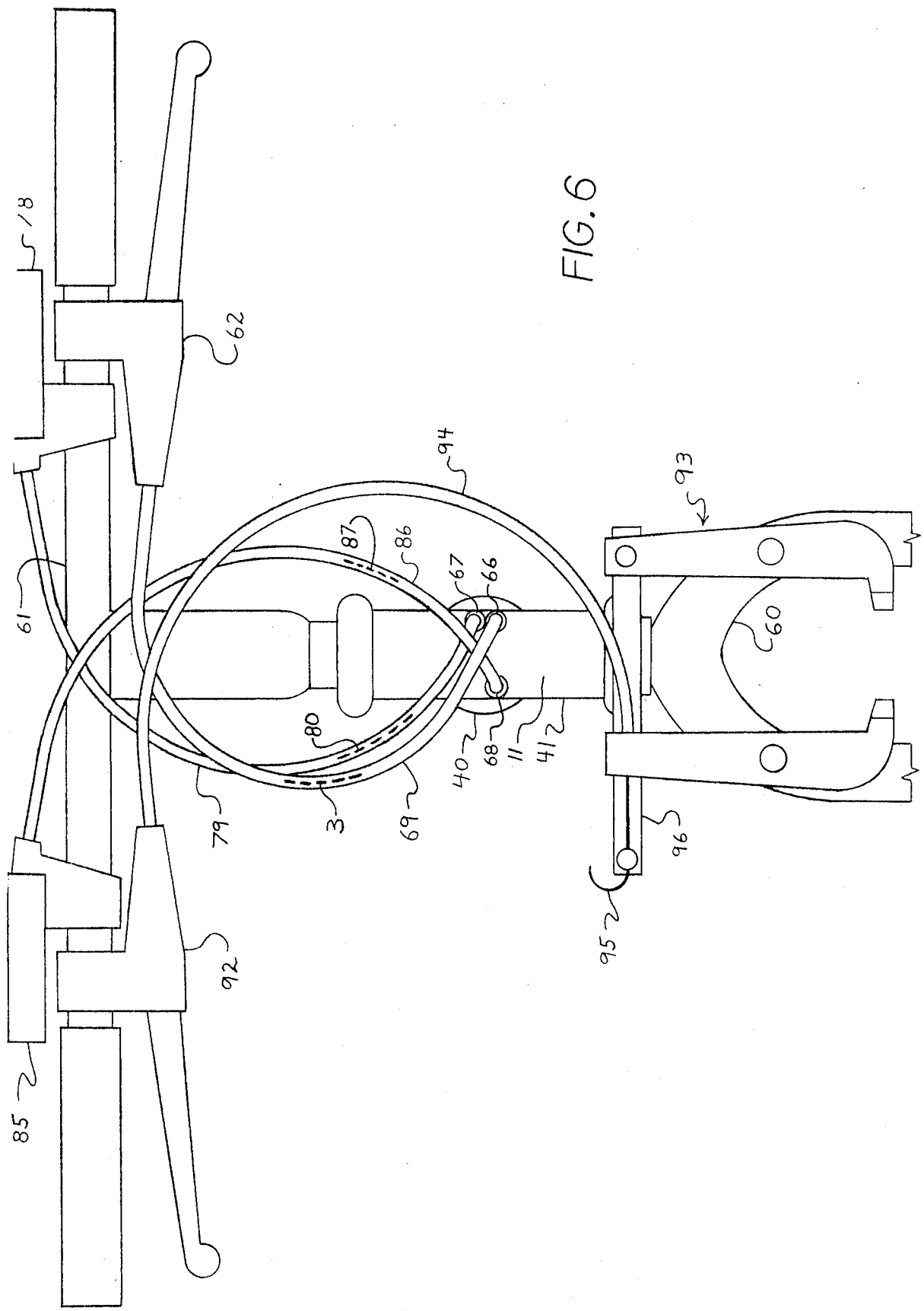

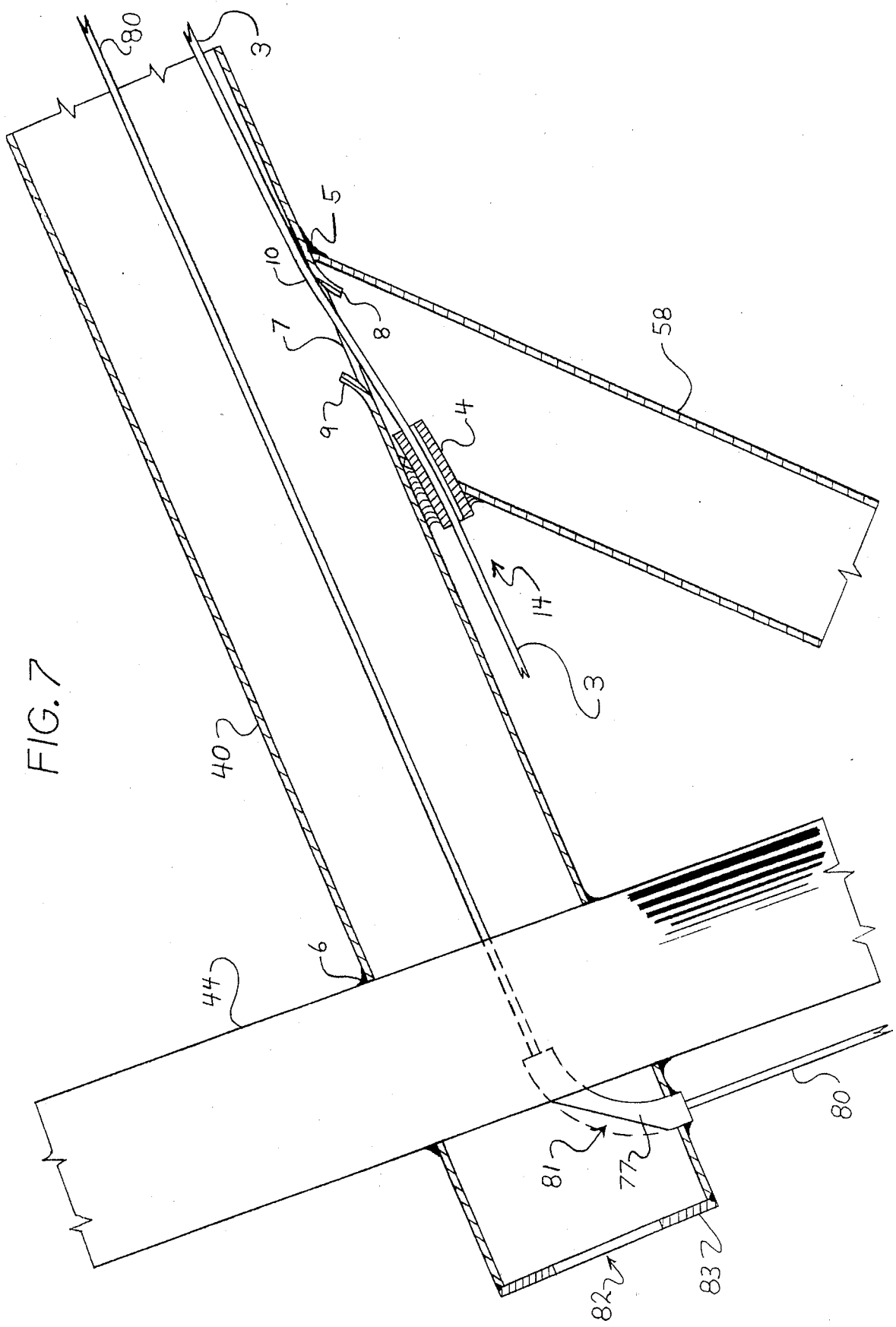

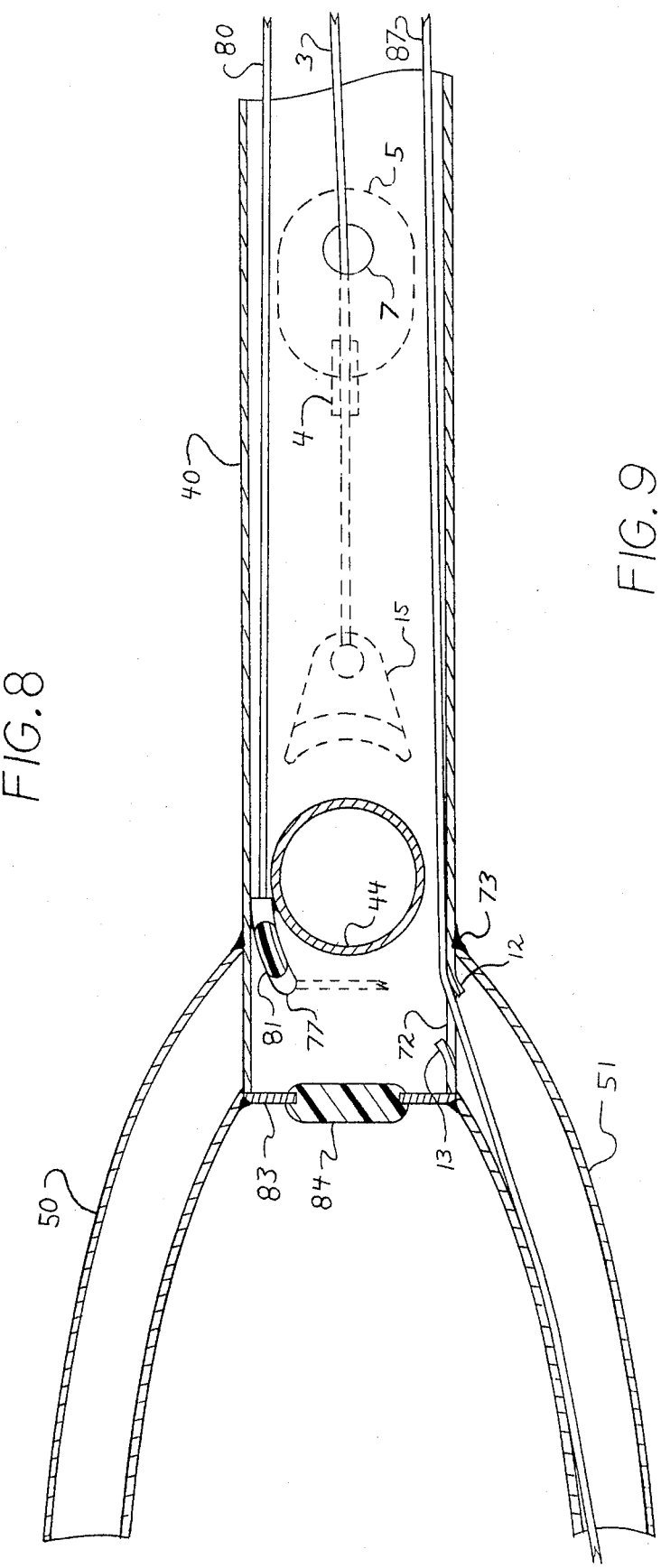

INTERNAL CABLE ARRANGEMENT FOR BICYCLE FRAME

BACKGROUND OF THE INVENTION

This invention relates to bicycles with frames adapted for the routing of control cables through the interiors of frame members. More particularly, it relates to a frame head tube portion, frame configuration and cable guidance elements which provide well sealed and direct internal control cable paths characterized by short cable lengths, low cable bending and the absence of outer cable (cable jacket or housing) passing through the frame. The invention obtains the benefits of control device actuation having low elasticity and low friction.

An example of the prior art in the internal cabling of bicycles is shown in U.S. Pat. No. 4,484,756 (Takamiya et. al.), where bosses are provided on the side of the main frame of a bicycle so that a jacketed cable (co-axial inner and outer cables) can be run through the frame from an entrance point behind the head tube to an exit point forward of the seat tube. U.S. Pat. No. 4,513,986 (Trimble) shows three internal cables inserted in a monocoque frame at locations behind the head tube. U.S. Pat. No. 4,585,246 (Diekman and Dietz) shows a jacketed cable which enters a top tube lug at a point behind the head tube and exits a seat post bracket at a point forward of the seat tube. U.S. Pat. No. 4,565,383 (Isaac) shows a rear derailleur inner cable that enters a chainstay behind the bottom bracket and exits through a rear dropout at a point forward of the rear axle. U.S. Pat. No. 4,647,060 (Tomkinson) shows control cabling entering the elongated frame member of a low profile bicycle at locations rearward of the headset bearings.

Areas in which control cabling can be improved are indicated by examination of factors which affect cable performance. An ideal cable would prefectly transmit motion from the lever which pulls it to the device it actuates. Elasticity detracts from this ideal by causing a loss in relative motion along the length of the cable. Friction detracts by causing a loss of transmitted force. Respectively, the effects of elasticity and friction are reflected in the terms 'spongy' and 'stiff', which are sometimes used to describe the imperfect feel of a control actuation.

Given a particular inner cable, the amount of elastic stretching caused by an applied tensile force is directly proportional to the cable length, which should thus be minimized. Because outer cable is also elastic and considerably more so than the frame tubes of a bicycle, a cable path will preferentially utilize frame parts rather than outer cable to provide that compressive resistance which must necessarily counter the tension of an inner cable.

Cable friction and attendant wear occur principally at cable bends, the magnitude of the friction increasing with the bend angle and decreasing with the bend radius. To reduce friction, it is thus desirable to eliminate bend locations, to reduce the bend angle where a cable path must turn, and to provide large curvature radii for necessary bends. Lubrication and the presence of fouling contaminants are also important factors, as are burrs, edges or crimping at transitions. A cable can bind tight in a section of housing if sufficient dirt and rust are present. Corrosive contamination is particularly severe in the vicinity of conventional bottom brackets and chain-stays. Further considerations with respect to internal cabling include the aesthetic appearance and aerodynamic effects of exposed cable sections and cable fittings.

SUMMARY OF THE INVENTION

One or more control cable frame entrance ports are located on either side of the front surface of the head tube portion of a bicycle frame. With a longitudinal position ahead of the bicycle's steering axis, a lateral position outward of the outer wall of the steering tube of an inserted fork, and an angular orientation in substantial parallel alignment with the spine tube portion of the frame, such a port initiates a bend-free internal cable path back through the frame. An improved control action results, and further improvement is obtained with a complementary overall frame layout and associated cable guide elements. Objects of this invention are: First, to provide control cable routing within the structural portions of a bicycle frame, thereby protecting the cable from snagging, fouling and corrosion, while promoting a simple uncluttered appearance of the bicycle. Second, to provide a straight cable path into and through the frame, thus minimizing friction and wear associated with cable bends. Third, to provide an internal cable path not requiring outer cable within the frame, thus utilizing the high compressive stiffness of the frame structure to counter inner cable tension. Fourth, to minimize the overall lengths of cabling required, thus decreasing the elasticity present in control actions and reducing the weight of installed cables. Fifth, to provide an internal cable path with such range of positionability that multiple variants of the basic path can be used together, without interference, for the in-frame routing of cable to at least three actuated devices (i.e., rear brake, front derailluer, rear derailleur) of common dual-derailleur bicycles. Sixth, to provide well-sealed cable entrance locations on the frame, with cable paths not requiring entrance or exit locations in regions of the frame subject to high levels of contamination. Seventh, to provide cable paths such that entrance and exit locations are within the width of the frame structure, thus promoting smooth air-flow along the frame.

A frame configuration used with this invention has a head tube portion joined with an approximetely perpendicular spine tube portion. The head tube portion carries the front fork headset bearings and the spine tube portion provides a structural function roughly comparable to that of the combination of the top tube and down tube of the diamond frame type of bicycle. In accordance with the invention, at least one port is provided for entrance of control cabling through the wall of the front half of the head tube portion. With the form of a counter-bored through-hole, this port advantageously locates the end of an outer cable section to initiate a bend free cable path into and back through the spine tube portion of the frame. Oriented tangentially on either side of the front of the head tube portion, such a port provides a cable path that passes through the annular clearance between the steering tube of an inserted fork and the interior wall of the head tube portion. Since both the head tube and spine tube portions are of oversize diameter with respect to conventional bicycle frames, a flaring of the front end of the spine tube portion provides a wide and vertically elongated area of contact with the head tube portion. This large contact area permits the practical location of at least two ports on either side of the forward surface of the head tube portion. By contrast, other internally cabled bicycles typically located cable entrances on the side of the frame through the wall of a top tube, a down tube, or a single main frame tube. (A top tube wall normally provides an entry point for cable to a seatstay mounted brake, with the down tube used for derailleur cables and cable to a chainstay mounted brake.) In bypassing the head tube and entering at one of these other locations, a cable must execute a bend to pass back through the frame. If the outer cable is continued into the frame, it tends to bend the inner cable gradually, but the weight and elasticity of the outer cable in the frame are incurred. If the outer cable terminates at the frame wall, a sharper bend is imparted by the entrance fitting, causing friction and wear at this location. With a side wall entry point, a control cable necessarily approaches the frame at a skewed angle. This effectively increases the frontal area of the bicycle while locally disrupting airflow in the region of the entry point.

In several ways, the invention thus makes improvement in the insertion of control cables into a bicycle frame. Entrance ports and approaching cable are aligned with the airflow and within the projected area of the frame structure. There is no bending of the cable at the entrance port. The port can be positioned over such vertical range that multiple ports initiate useful straight cable paths back through the length of the spine tube portion of the frame. These straight paths obviate the use of outer cable inside the frame. Further, since cables typically pass by a head tube as they descend from handlebar levers, a shorter section of outer cable is required to reach a port on the front of the head tube. The invention additionally provides a particularly well sealed cable entrance into the frame. The front surface of the head tube is a clean location with respect to contaminants thrown off of the tires. Since the outer cable from a control lever does not have to be guided through the frame, the outer cable end can be tightly inserted into a counter-bore of the port, thereby sealing the cable entrance. Where, by contrast, an outer cable section enters a frame through a hole sized for some installation clearance, this clearance provides an entry for contaminants and lets the cable slide in and out of the frame slightly, as it is pulled and flexed by lever actuation and handlebar rotation.

The invention facilitates a frame configuration and cable guide elements which benefit the complete courses of control cabling to actuated components, such as a rear brake, front derailleur, and rear derailleur. Because the spine tube frame portion extends directly from the head tube portion towards the locations of actuated components, cable paths are short and cable bending is minimized. The invention is advantageous with a frame configuration in which the rear brake is mounted under the forward ends of the seatstays close to their attachments with the rear end of the spine tube portion. Because the seatstays are in substantial alignment with the spine tube portion, the brake cable actuation direction is in essential alignment with a cable path from a port on the front of the head tube portion of the frame. No position around the rear wheel places the rear brake closer to the head tube portion, thus the total cable path is approximately 80 to 90 percent as long as the paths to rear brakes conventionally mounted at the positions of seatstays or chainstays of diamond frame bicycles. Between the cable entrance port and a center-pull rear brake, a rear brake cable associated with this invention is only bent through an aggregate angle of approximately ten degrees, this occurring where it makes a mile ess-bend before exiting the frame. By contrast, a brake mounted on the seatstays of a diamond frame bicycle will typically be actuated by a cable running within the top tube and then turned for alignment with the seatstays, thus incurring a vertical-plane bend angle of approximately 45 to 60 degrees. (The monocoque frame of U.S. Pat. No. 4,513,986 shows a similar routing and associated bending for a rear brake cable) There is also lateral curvature in the section of outer cable which typically exits a top tube, top tube lug (U.S. Pat. No. 4,585,246) or main frame tube (U.S. Pat. No. 4,484,756), and then loops around a seat tube or seatpost to a rear brake. Alternatively, if a brake cable runs conventionally along or within a down tube, it must also execute a 45 or 60 degree bend angle to align with a chainstay mounted brake. A further advantage of this rear brake cable path associated with the invention is that the cable exit position is protected from contamination. By virtue of its location within a small triangular region bounded by three frame tube portions, the rear brake cable frame exit port is shielded from contaminents thrown off the tires.

With a modified derailleur, the invention facilitates a front derailleur cable routing that is particularly direct, well protected and without outer cable inside the frame. A front derailleur is adapted to be operated by a bare inner cable descending from a cable turning exit fitting installed through the bottom wall of the spine tube portion of the frame. The total derailleur cable length is approximately 85 percent of that required for a front derailleur cable conventionally routed through a down tube (or within the monocoque frame of U.S. Pat. No. 4,513,986), then turned at a bottom bracket to ascend to a front derailleur. Further, the turn-cable exit fitting within the spine tube frame portion turns the cable through an angle of 90 degrees, which is approximately 20 degrees less than that of the bend conventionally made at the location of a bottom bracket. The front derailleur cable is exposed for only about three inches and, because the cable exit location is on the bottom of the frame, gravity works to cause contaminants to fall off rather than be dragged into the frame. Furthermore, the cable exits the frame at a location that is relatively well protected. The seat tube shields it from contaminants thrown off of the front tire and, because the trajectory of particles thrown off a tire appears to be angled towards the direction of rotation, the closed rearward end of the spine tube portion protects from contaminants thrown off the rear tire. (Where conventional derailleur cable guides and fittings are found at locations around the bottom bracket, the front and rear tires throw contaminants, respectively, into the front and back of this region.)

The invention accomodates an internal rear derailleur cable routing that is short, straight, without outer cable inside the frame, and without an out-of-frame excursion at the bottom bracket. Not present are cable bend locations equivalent to those variously combined bends conventionally associated with a down tube wall frame entry point (behind the head tube), a down tube exit point (ahead of the bottom bracket), a chainstay wall entry point (behind the bottom bracket), a chainstay wall exit point (forward of the rear wheel dropout), or a dropout exit point (ahead of the rear axle). The substantial alignment of the spine tube and seat stay portions of the frame provides a derailleur cable path that is approximately eight percent shorter than a conventional routing. Where a conventional rear derailleur cable bends approximately 40 to 50 degrees to re-align between a down tube and a chainstay, the cable associated with the invention experiences an aggregate bending of approximately 20 degrees to re-align between the spine tube portion and the rear end of the seatstay. This bending is done inside the frame and without additional guide elements. The cable passes into the forward end of the seatstay through a hole in the wall of the spine tube portion. This hole has an outwardly flared forward edge to smoothly bend the cable, and an inwardly flared rearward edge to facilitate cable installation. The inside wall of the seatstay naturally guides the cable through the remaining few degrees of aggregate bend angle, providing alignment with the rear end of the seatstay. In contrast to a conventional internal rear derailleur cable which bends laterally to exit the side of a chainstay or dropout ahead of the rear axle, the invention facilitates a straight cable exit through the end of the seatstay behind the rear axle. Curvature in the loop of jacketed cable to the rear derailleur is reduced by approximately 20 degrees, and both the orientation and location of the seatstay end reduce the length of this loop.

The cable paths associated with this invention facilitate a frame configuration which provides benefits in addition to those associated with effecient cabling. In contrast to the position of a conventional top tube, the lower position of the spine tube portion provides a high standover clearance (frame-to-crotch dimension while standing). Particularly in off-road riding, this clearance is advantageous during stops, falls and the semi-dismounted pushing of a bicycle.

Further advantage results from the concentration of the principal frame structure in a single spine tube portion of large sectional area. With torsional stiffness proportional to the third power of sectional area, a torsionally stiff frame is obtained by concentrating the structure in a single tubular portion aligned directly between the region of the fork bearings and the rear axle. This torsional stiffness keeps the wheels in the same plane, as pedal forces work to twist the frame.

Ride harshness is caused by ground surface roughness, and the degree to which it is transmitted to the rider is largely a function of the vertical bending stiffness of a bicycle frame about its longitudinal axis. In this respect, the single spine tube portion associated with the invention is benefecially more compliant than the truss structure formed by the vertically separated top tube and down tube of a conventional diamond frame configuration.

BRIEF DESCRIPTION OF THE DRAWINGS

FIG. 3 is a view of the forward end of the frame, the view taken in front of the frame in the direction indicated by D—D in FIG. 1.

FIG. 4 is a side view of the forward end of the frame, the forward end of the frame rotated downwardly approximately 30 degrees from its orientation in normal operation.

FIG. 5 is a half sectional view of the forward end of the frame, the view direction from above in alignment with the steering axis S in FIG. 4, the section plane indicated by A—A in FIG. 3.

FIG. 6 is a view of the front of the frame with components installed, showing control cables routed from handle bar levers to the frame and to a front brake, the direction of the view indicated by D—D in FIG. 1.

FIG. 7 is a sectional side view of the central portion of the frame, with the left seatstay omitted and with the rear brake and front derailleur cables installed, the section plane orientation indicated by C—C in FIG. 2.

FIG. 8 is a sectional view of the central portion of the frame, with three control cables installed, the view direction and section plane orientation indicated bt B—B in FIG. 1.

FIG. 9 is a sectional view of the rearward end of the right seatstay of the frame, with the rear derailleur cable installed, the view direction and section plane orientation indicated by B—B in FIG. 1.

FIG. 11 is a sectional side view of the forward end of the frame of FIG. 10, the forward end of the frame rotated downwardly approximately 30 degrees from its orientation in normal operation, the section plane indicated by F—F in FIG. 10.

DETAILED DESCRIPTION

Figure 1:
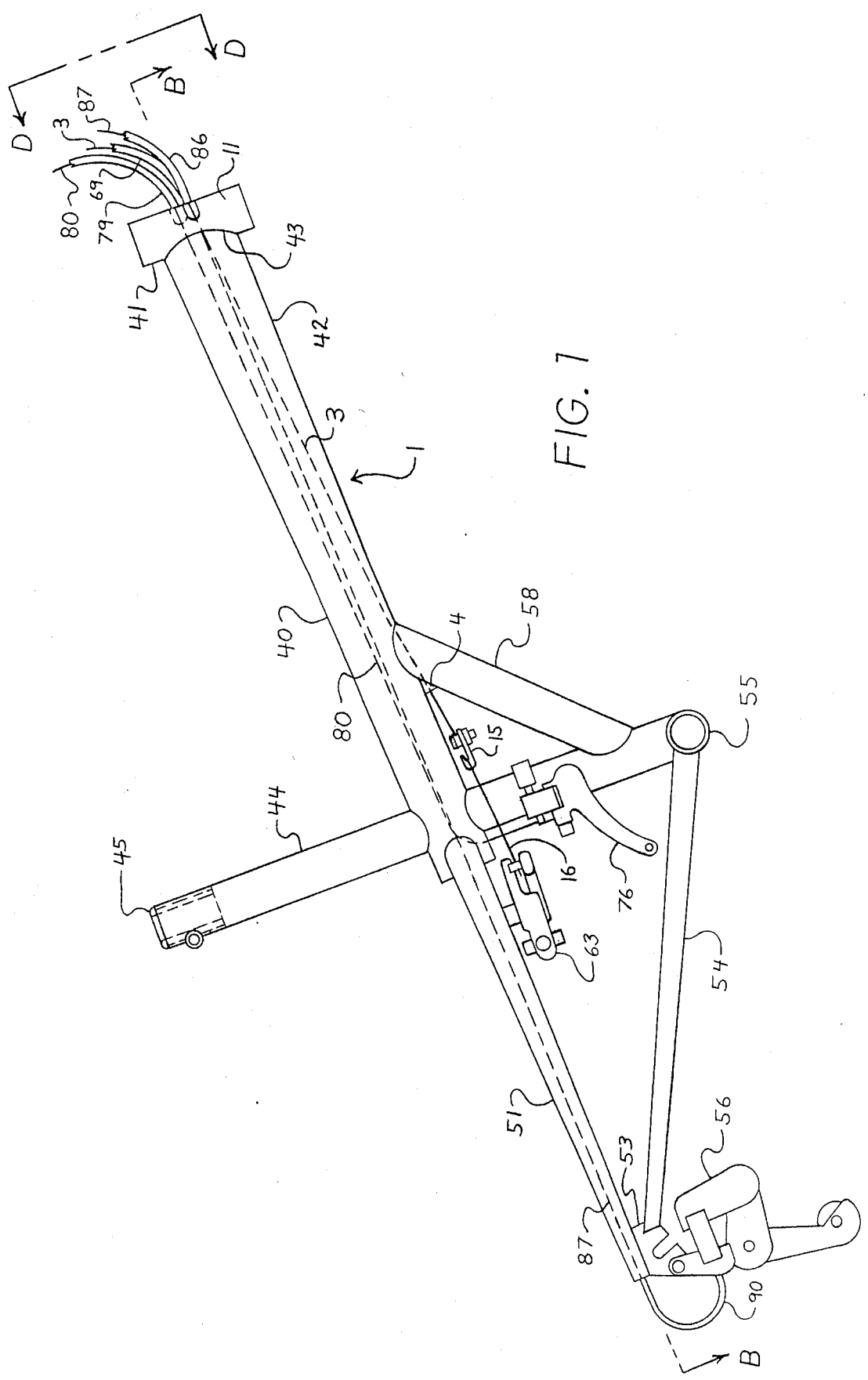
FIG. 1 is a side view of a bicycle frame in accordance with the invention, with componentry actuated by control cabling installed on the frame.
Figure 2:
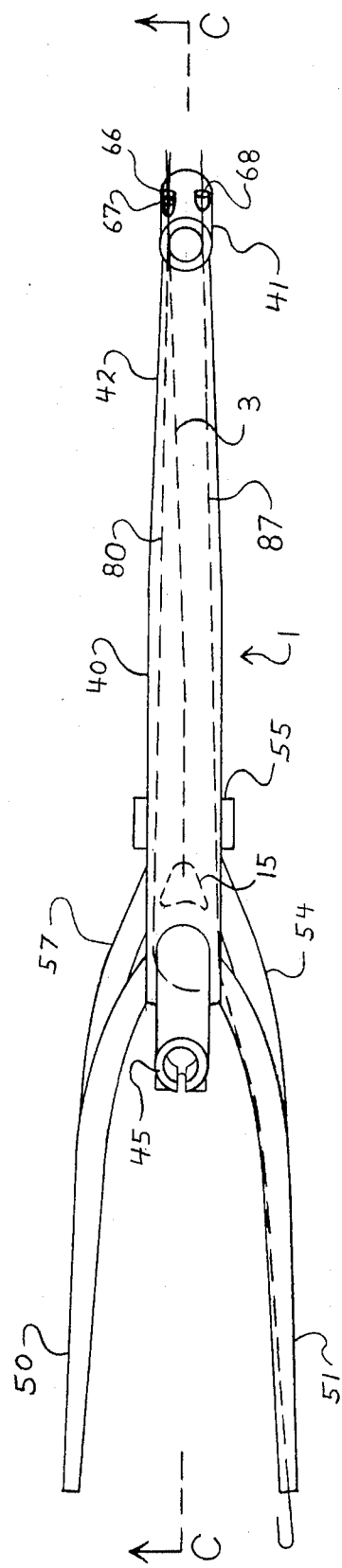
FIG. 2 is a top view of the frame showing the paths of control cabling within the frame structure.

The bicycle frame 1 shown in FIGS. 1 and 2 is characterized by a general configuration that provides a riding position (hand, foot and saddle locations) equivalent to that of a conventional diamond frame bicycle of similar size. The frame 1 is assembled with the following unmodified components, which are standard in the sense that functional equivalents are mass-produced by a number of manufacturers: wheel assemblies (hubs, spokes, rims, and tires), brake parts (rear caliper, handlevers and cable), shift parts (shift levers, rear derailleur and cable) crankset, freewheel, headset, grips, pedals, seat, seatpost, fork and handlebar.

The frame 1 is a welded and brazed assembly of, primarily, thin-walled steel tubes (steel type 4130N). A single 'spine tube' 40 of large diameter (2 inch O.D.×0.035 wall thickness) provides a structural function comparable to that of the top tube and down tube of a conventional diamond frame bicycle. ('Spine tube' is a designation employed here in lieu of a generally accepted term for this part of a bicycle.)

An oversize seat tube 44 (1.5"×0.035") is welded into a hole through the rearward end of the spine tube 40, the seat tube in an orientation approximately perpendicular to the spine tube. An aluminum seatpost collar 45 is inserted in the top end of the seat tube 44. A vertical split in the rearward wall of the seatpost collar permits pinch bolt clamping forces to be transmitted to a seatpost of conventional diameter.

The forward end of the spine tube carries an oversize head tube 41 (1.5"×0.035"). The round spine tube 40 is partially reformed by making a progressive flare 42 of the forward end. As shown in FIGS. 3, 4, and 5, an effect of this flare is to increase the depth and reduce the width of the spine tube 40 where it joins the head tube 41. This results in an advantageous shape for the head tube to spine tube joint 43, where one advantage is that the increased vertical span of this joint will lower those maximum joint stresses associated with the high in-plane forces generated by a loaded bicycle subjected to road roughness.

A pair of similar seatstays, left seatstay 50 and right seatstay 51, connect between the spine tube 40 and, respectively, a left rear dropout and a right rear dropout 53. A right chainstay 54 and a left chainstay 57 run forward from the respective rear dropouts to the bottom bracket tube 55. In typical fashion, the seatstays and chainstays are tapered and have mild inward lateral bends for tire clearance.

An abbreviated down tube 58 (1.375×0.035) connects between and serves as a brace for the seat tube to spine tube joint 6.

Utilizing a standard headset (bearing pair) installed in the two rings 59 brazed into each end of the oversize head tube 41, the frame carries a conventional front wheel fork 60, which is fitted with a handlebar/stem assembly 61.

The frame 1 incorporates mounting elements for the entrance, exit and guidance of three internal control cables, such that the location and orientation of these fittings provide short and well sealed cable paths with minimal bend locations and low aggregate bend angles. FIG. 6 shows the origination of two brake cables and two shift cables at conventional control levers clamped to the handlebar 61.

The left hand brake lever 62 operates the rear brake caliper 63 by means of a twisted-strand type inner brake cable 3, that passes first through a section of spiral-wound outer cable 69 and then enters the frame 1 by engaging a brake cable frame entrance fitting 66 installed tangentially at a location just below midheight on the left side of the forward half 11 of the head tube 41. The rearwardly projected centerline of brake control entrance fitting 66 or port is laterally offset from the steering axis by a distance greater than the outside radius of the steering tube 91. The head tube forward half 11 is that portion of the frame 1 which is ahead of the lateral plane indicated by G—G in FIG. 5, this lateral plane including the bicycle's steering axis, which is shown as the center line S in FIG. 4. (With a round head tube 41, the surface of this forward half 11 is all that head tube portion of the frame 1 which is visible from a vantage point directly ahead of the frame). A cable entrance fitting 66, 67 or 68 has a cylindrical exterior form with its rearward end shaped as an offset cylindrical concavity matching the curvature of the outer surface of the head tube 41. The cable entrance fittings 66, 67 and 68 each have the interior form of a stepped port 32, such port having a centered axial through-hole 33 with a counterbore 34 in the forward end.

The rear brake outer cable section 69 terminates within the frame entrance fitting 66. Associated with each cable entering the frame 1 are two co-linear holes in the head tube 41, there being a forward tangential hole 70 having a visible entrance fitting installed and a rearward tangential hole 71 that is within the perimeter of the joint 43 between the head tube 41 and the spine tube 40. The rear brake inner cable 3 enters the spine tube by passing first through the entrance fitting 66, then through the forward tangential hole 70, and then through the rearward tangential hole 71. FIG. 7 shows that the rear brake inner cable 3 extends back within the spine tube 40 and exits the frame 1 by passing first through the hole 7 and then through the exit fitting 4. The hole 7 pierces the lower wall of the spine tube 40 within the perimeter of the joint 5 between the spine tube and the abbreviated down tube 58. Edges of the hole 7 are flared by the application of heat and then bending with and inserted cylindrical bar. The downwardly flared forward edge 8 of the hole 7 gives the brake cable 3 a smooth and gently rounded contact surface where it makes a mild bend 10 leaving the spine tube 40. The upwardly flared rearward edge 9 of the hole 7 facilitates cable installation by catching the end of the cable 3 as it is pushed back through the frame 1. The rear brake cable exit fitting 4 is a tubular piece with a very slight upward bend to provide a large radius for the small turn which the position of this fitting causes in the cable 3. The rear brake cable exit fitting 4 pierces the upper rear wall of the abbreviated down tube 58, thereby locating within the region of the apex 14 of the angle between the spine tube 40 and the abbreviated down tube 58. The rear brake inner cable terminates at a yoke 15 which conventionally transmits actuation force to the two ends of a yoke cable 16 spanning the two arms of a conventional centerpull type caliper brake 63. The arms of the brake 63 mount on two bosses, one boss welded to the bottom surface of each seatstay.

The front derailleur 76 is operated by the left hand shift lever 78 on the handlebar 61. An outer cable section 79 runs to an entrance fitting 67 that is identical to and located just above the rear brake cable entrance fitting 66. The front derailleur inner cable 80 runs rearward along the inside of the spine tube 40 and, passing by the left side of that part of the seat tube 44 which is hidden inside the spine tube, is turned through an angle of approximately 90 degrees by a turn-cable exit fitting 77 which has the form of a short piece of brass tubing bent into an elbow shape and brazed in place at each of its ends. FIG. 7 shows that a portion of the back wall 81 of the turn-cable exit fitting 77 has been machined away so that the bare cable end can be installed around the bend with guidance by such tool as a pencil's eraser end inserted through the one inch diameter center hole 82 of the 2 inch washer 83 welded to the rearward end of the spine tube 40. FIG. 8 shows a removable plug 84 installed in the center hole 82 of the washer 83.

Exiting the frame 1, the front derailleur inner cable 80 descends from the lower end of the turn cable exit fitting 77 and attaches to the front derailleur 73. The front derailleur 73 is a conventioanl unit modified to fit an oversize seat tube, and modified for actuation by a cable approaching it from above. (Front derailleurs typically employ inner cable, with or without a section of outer cable, with the cable approaching the derailleur from below. The modified front derailleur 73 includes a stationary guide piece which normally turns the cable approximately 90 degrees in changing the generally downward pull direction of an inner cable to a generally lateral direction. This guide piece is re-installed in the position required to turn the cable approximately 90 degrees in changing the general pull direction from an upward one to a lateral one.)

The rear derailleur 56 is operated by a cable that originates at the right hand shift lever 85. The rear derailleur first outer cable section 86 runs from the shift lever to a frame entrance fitting 68 on the right side of the head tube 41. This rear derailleur cable frame entrance fitting 68 is shown in section on FIG. 5. FIG. 3 shows that this fitting 68 is located just below mid-height on the right front surface of the head tube 41, thus having an orientation and a location which are symmetric with respect to the rear brake cable entrance fitting 66 on the other side of the head tube forward half 11. FIG. 8 shows that the rear derailleur inner cable 87 runs rearward inside the spine tube 40, passing to the right of the portion of seat tube 44 that is inside the spine tube. The inner cable 87 then enters the right seatstay 51 through a hole 72 in the wall of the spine tube 40, this hole so located as to be within the perimeter of the joint 73 between the seatstay and the spine tube. (Prior to frame assembly, heat and a cylindrical tool were used to reform the perimeter of the hole 72, the outwardly flared forward edge 12 providing smooth cable travel and the inwardly flared rearward edge 13 facilitating cable installation.) FIG. 9 shows that the rear derailleur inner cable 87 passes rearward through the right seatstay 51 and exits the frame 1 in a direction parallel with the longitudinal axis of the seatstay. A cylindrical cable exit fitting 88 is fixed within and guides the cable 87 through the center of the rearward end of the right seatstay 51. A second rear derailleur outer cable section 90 originates within the counter-bore of the exit fitting 88. The outer cable 90 guides the inner cable 87 as it loops down and forward to the conventional rear derailleur 56, as shown if FIG. 1.

The rear brake cable entrance fitting 66, the front derailleur cable entrance fitting 67 and the rear derailleur cable entrance fitting 68 are shown and described as having orientations perpendicular to the longitudinal axis of the head tube 41 and parallel with the centerplane of the frame 1. (The frame centerplane includes the longitudinal central axes of the spine tube 40, the head tube 41 and the seat tube 43.) With the fittings so oriented and located in tangentially offset locations on the front of the head tube 41, alignment is provided for essentially straight passages of the inner cables through the fittings and back along the inside of the spine tube 40. The alignment is not perfect, however, due in part to the approximately three degrees by which the head tube 41 is tipped forward of perpendicularly with respect to the spine tube 40. (This tipping angle will vary within a range of small angles depending upon the particular wheelbase and head angle employed.) For the frame 1 presented here, the misalignment is greatest for the rear brake cable 3, because the location of its frame exit is on the bottom of the spine tube 40. A bend-free alignment can be obtained by adjusting the orientation of the front end of the brake cable entrance fitting 66 approximately six degrees upwardly (beyond perpendicularity with the head tube 41) and approximately three degrees outwardly (beyond parallelism with the frame centerplane). Such adjustments do not substantially alter the description set forth of the locations or orientation of the cable entrance fittings. (It is noted that where the prior art shows cables inserted in bicycle frame tubes, lateral skew angles exceed approximately 20 degrees and insertion locations are such that it is not possible to make adjustments to provide bend-free cable paths back through the tubes.)

FIG. 6 shows that an outer cable section 94 and an inner cable 95 connect the right hand brake lever 92 with the front brake caliper 93. The front brake caliper 93 is a conventional centerpull type that has been modified for sidepull actuation by the incorporation of a cross-link adapter 96. Un-modified commercial centerpull brakes cannot be used with the frame 1 because turning of the front wheel would cause interference between a typical descending front brake cable and the other three control cables just forward of the locations of their insertions in the front of the head tube 41. The frame 1 can also be used with certain commercial sidepull type brakes having angled cable paths, though a degree of cable interference has been tolerated with the use of one example of such type that is capable of spanning large section tires.

Figure 10:
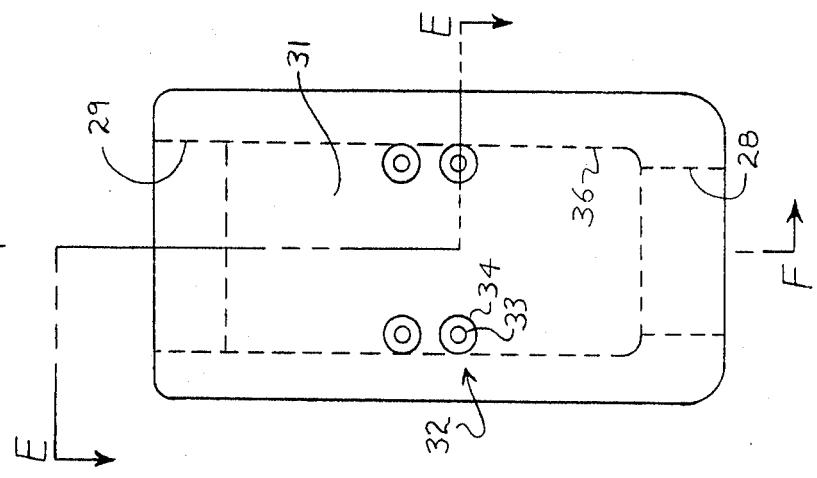
FIG. 10 is a view of the forward end of a frame of alternative construction in accordance with the invention, the view taken in front of the frame in the direction indicated by D—D in FIG. 1.
Figure 12:
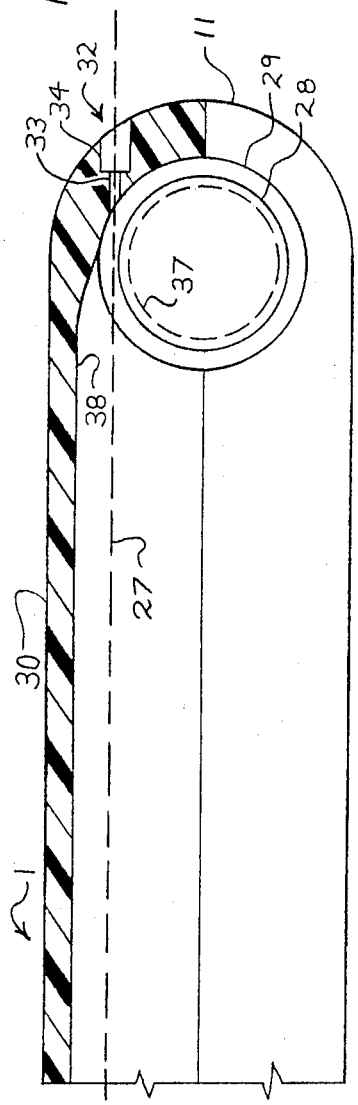
FIG. 12 is a half-sectional view of the forward end of the frame of FIGS. 10 and 11, the view direction from above in alignment with the steering axis S in FIG. 11, the section plane indicated by E—E in FIG. 10.
Figure 17:
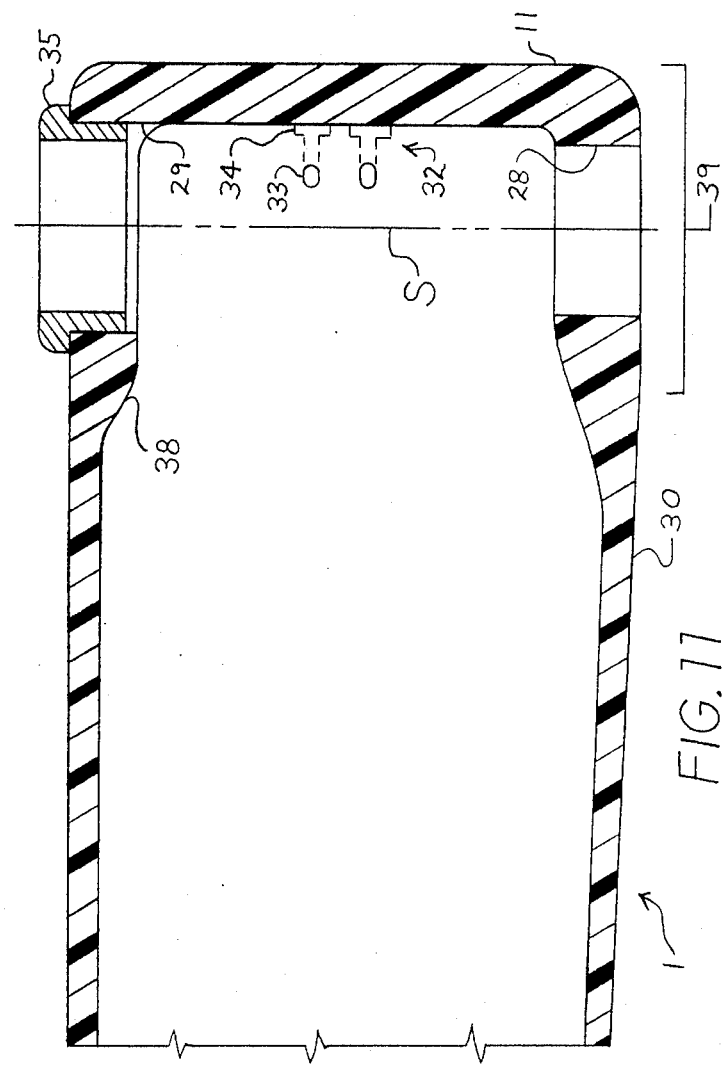

A welded and brazed construction of steel tubing is associated with the preferred embodiment which has been described. This construction advantageously maximizes the use of commercially available bicycle frame parts and standard round tubing. However, other materials and variants in frame construction may be employed in accordance with the invention. Where the preferred embodiment shows a head tube portion that is a brazed assembly of a head tube 41, headset rings 59 and cable entrance fittings 66, 67 and 68, this assembly may alternatively be cast in one piece, much as a frame lug. Where the embodiment described has a head tube 41 welded to a spine tube 40, these portions of the frame may be formed as a continuous integral unit. FIGS. 10, 11 and 12 show the front end 30 of a frame 1 of fiber-reinforced plastic construction. The forward half 11 of the head tube portion 39 is that part of the front end 30 which is ahead of the steering axis, where the steering axis is indicated by the center line S. Four cable entrance ports 32 are molded within the wall of the forward half 11 of the head tube portion 39. Each port 32 has a through hole 33 and counter-bore 34 which, respectively, provide frame entrance for an inner cable and location for the end of a section of outer cable. As such, each port is equivalent in function, form, location and orientation to the bore of a cable entrance fitting 66, 67, or 68 of the preferred embodiment. FIG. 12 shows that such a cable entrance port 32 also provides a bend-free cable path into and along the inside of the frame 1, this path passing through the clearance between the inside wall 38 of the head tube portion 39 and the outside diameter 37 of the steering tube (91) of a typical fork. FIG. 11 shows a bearing adapter ring 35 which will concentrically located a standard sized upper headset bearing in an oversized bore 29. (Since the lower headset bearing typically carries higher loads than the upper bearing, such an adapter ring may optimally be installed at the lower headset bearing position 28). The dashed lines 36 in FIG. 10 show the intersection of the frame inner wall 38 with the lateral plane that includes the steering axis S, thus further indicating the alignment of the ports 32 with the interior of the frame 1. Where 3 ports 32 may be provided for the entrance of internal cabling to a rear brake, a front derailleur and a rear derailleur, the four ports 32 shown provide an additional entry for a cable to actuate, for instance, a seatpost clamp that is operated by a lever on the handlebar. Such an additional port 32 and further additional ports 32 may also be used as entrances for wiring, such as that between a handlebar mounted lamp and a generator at the rear wheel, or wiring between a cyclo-computer and a sensor on a crank arm or the rear wheel hub.

While the greatest advantage is obtained without outer cable (housing) within the frame, the invention also provides a similar bend-free frame entrance for a jacketed cable. With this variation, the cable entrance port has a simple cylindrical interior form, and the greater cable path diameter associated with the outer cable incurrs a somewhat greater minimum lateral clearance between the outside wall of the steering tube and the inside wall of the frame. The outer cable may usefully guide the inner cable through the frame to a cable exit port. To locate the end of the outer cable within the frame, the exit port would have the interior form of a counter-bored through-hole. To provide the outer cable a passage through the wall of the frame, the exit port would have a simple cylindrical interior form.

Further useful variations in frame configuration are obtained within the scope of the invention, particularly with respect to the number and form of the rear wheel stays and the type and location of a rear brake. Otherwise in accordance with the cabling and over-all frame layout of the preferred embodiment, a prototype bicycle was constructed with a sidepull caliper rear brake, with no chainstays, and with each of two oversize seatstays in substantially the same positions as the left seatstay 50 and the right seatstay 51 of the preferred embodiment. Each seatstay of this prototype is of vertically oriented oval cross-section, and without tapering or a change in wall thickness along the length of the stay. Testing showed an unacceptable degree of rear wheel deflection caused by chain tension. General performance, however, indicated that a two stay rear could be effective but, to be efficient with respect to frame weight, the expense of specially formed seatstays will be incurred. When the two-stay prototype was fitted with a single chainstay on the right side, the rear wheel deflection was reduced to normal levels, thus indicating the viability of a three stay-variant of the preferred embodiment. Furthermore, a number of motorcycle designs incorporating a single sided rear wheel swingarm suggest the possibility of a bicycle frame with a single rear wheel stay. With structural loads concentrated in a single spine tube portion, the frame configuration facilitated by this invention particularly suits the incorporation of a single stay between the spine tube portion and a rear axle. The interior of such a single stay would provide essentially the same path for an internal cable as that path which is used by the rear derailleur cable 87 with the preferred embodiment. Thus, for all cases in which a bicycle frame has at least one rear wheel stay in the general position of the right side seatstay 51 of the preferred embodiment, the internal cabling and the overall frame layout associated with the invention may be usefully applied. Furthermore, the described cable 87, which passes through the right seatstay 51 to the rear derailleur 56, is readily adaptable to the actuation of, for instance, a hub type rear brake or multi-speed in-hub transmission. The position of the left seatstay 50 of the preferred embodiment provides similar opportunity for structure and cable routing as that described for the right seatstay 51, and cables may be routed through both seatstays of the same frame.

Figure 13:
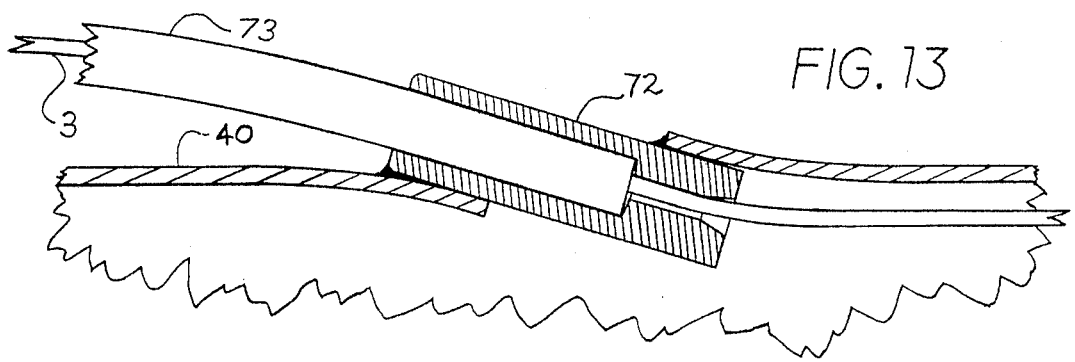
FIG. 13 is a view of the axial mid-section of an alternative rear brake cable exit fitting, illustrating the orientation of the fitting in a hole through the wall of the spine tube of the frame.
Figure 14:
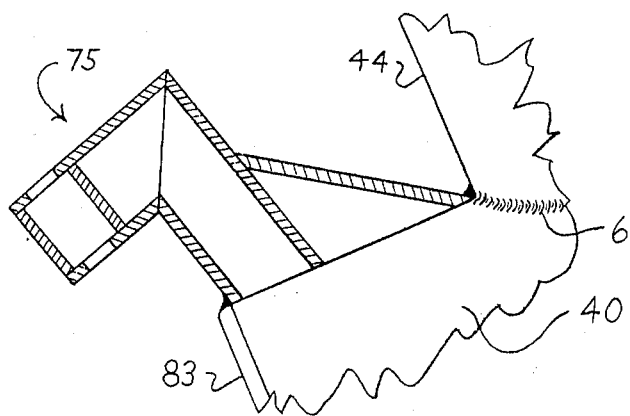
FIG. 14 is a side view of the rearward end of the spine tube of the frame, showing the mid-section of an alternative rear brake caliper mounting weldment, the orientation of the section plane indicated by C—C in FIG. 1.

The scope of the invention is not limited by the particular cable function associated with each possible cable entrance port location on the front of the head tube portion of the frame 1. For instance, the type and position of the rear brake affect the optimal arrangement of the control cable entrance ports 32 (or fittings) and the coincidence between cable function and port location. A sidepull caliper brake is located above the seatstays of the three-stay prototype frame described. This brake has a single central mounting bolt installed through a weldment 75 (FIG. 14) on the top of the rear end of the spine tube 40. A loop of outer cable 73 is routed rearwardly to a caliper arm from a skewed cable exit fitting 72 (FIG. 13) installed through the wall of the spine tube 40. This fitting, having a through-hole and counter-bore, is located on the upper left side of the spine tube 40 adjacent to the upper end of the abbreviated down tube 58. In this case, the frame entrance locations of the front derailluer and rear brake cables are reversed, with respect to entrance locations associated with the description of the preferred embodiment. That is, the rear brake cable outer section 69 and inner cable 3 are routed from the brake lever 62 to the cable entrance fitting 67. The front derailleur outer cable section 79 and inner cable 80 are routed from the shift lever 68 to the cable entrance fitting 66. If the same sidepull rear brake caliper is mounted beneath the seatstays, then the skewed cable exit fitting 40 is moved around the spine tube wall to a position on the lower right side of the spine tube 40, this position adjacent to the upper end of the abbreviated down tube 58. In this case, the first rear brake outer cable section 69 and inner cable 3 are routed to the entrance fitting, shown in FIG. 3. The rear derailleur outer cable 86 and inner cable 87 are then routed to an entrance fitting at the position indicated by the dashed circle 26.

The application of this invention does not require strict parallel alignment between the spine tube 40 and the seatstays 50 and 51. With, for instance, a shorter wheelbase, it may be beneficial to elevate the joint between these frame portions, thus maintaining space below for a front derailleur 76 or a rear brake 63. Conversely, if the frame is to be without chainstays 54 and 57, then lowering this joint tends to align the seatstays 50 and 51 with the direction of chain pull, thus reducing that bending of the stays which is induced by chain tension.

Furthermore, the abbreviated down tube 58 may be eliminated or changed in length, orientation and points of attachment. Its lower end may be joined with the bottom bracket tube 55 and its upper end may attach further forward on the spine tube 40. A sort of shallow diamond frame configuration is obtained by including a full down tube between the lower end of the head tube 41 and the bottom bracket tube 55. While this is not a particularly advantageous use of the invention, those elements associated with the internal cabling are applicable as described. In the case of a one-stay or two-stay frame of fiber-reinforced plastic construction, the abbreviated down tube 58 may optimally be omitted.

A versatility is indicated by the variants presented in describing this invention. Further variations within its scope are encountered as the invention is applied to other bicycle types, in different materials of construction, and with alternative componentry.

We claim:

1. In a bicycle frame having upper and lower headset bearing bores, the frame characterized by a steering axis, the steering axis coincident with the axial centerline of the steering tube of an inserted front wheel fork, the steering tube passing through and between the upper and lower headset bearing bores, the steering axis positioned and aligned through the centers of the upper and lower headset bearing bores, the improvement wherein at least one control cable entrance port is provided through the wall of the frame, said port intersecting that portion of the frame outer wall which is forward of the steering axis, the rearwardly projected centerline of said port laterally offset from the steering axis by a distance greater than the outside radius of the steering tube.

2. The improvement of claim 1, where said control cable entrance port is a through-hole, said port locating and providing passage for an outer cable housing into the interior of the frame, the outer cable housing to enclose and guide an inner cable.

3. The improvement of claim 1, where said control cable entrance port is a through-hole with a counter-bore, the counter-bore located at the forward end of the through-hole, the through-hole for passage of an inner cable into the interior of the frame, the counterbore to receive and locate the end of a section of outer cable housing in the wall of the frame, the outer cable housing to enclose and guide the inner cable to the frame, the inner cable to pass through the interior of the frame.

4. A bicycle frame in accordance with claim 1 having at least two similar control cable entrance ports located through the wall of the frame, said ports spaced apart vertically, said ports in substantially the same lateral position, each of said ports intersecting that portion of the frame outer wall which is ahead of the steering axis.

5. A bicycle frame in accordance with claim 1 having at least one control cable entrance port located on each side of the frame, each said port intersecting that portion of the frame outer wall which is ahead of the steering axis.

6. A bicycle frame in accordance with claim 1, at least two control cable entrance ports located through the frame wall on one side of the frame, at least one control cable entrance port located through the frame wall on the other side of the frame, all of said ports intersecting that portion of the frame outer wall which is ahead of the steering axis.

7. A bicycle frame in accordance with claim 1, the frame having means to guide a front derailleur cable through and out of the interior of the frame, said means rearwardly locating the path of a cable extending back from a cable entrance port at the front of the frame, said means orienting the cable in substantial parallel alignment with the interior wall of the frame, said means then turning the cable downward through an angle of approximately ninety degrees, said means then providing a cable passage through the frame wall, whereby an installed cable is guided to descend from the frame to a front derailleur installed on the frame.

8. A bicycle frame in accordance with claim 1, the frame comprising a head tube joined with the forward end of a spine tube, said head tube in substantial perpendicular alignment with said spine tube, said head tube of substantially cylindrical tubular form, said spine tube of substantially cylindrical tubular form, said spine tube having a diameter greater than the diameter of said head tube, a progressive flare formed at the forward end of said spine tube, said flared forward end of said spine tube having a width substantially equal to the outside diameter of said head tube, said flared forward end of said spine tube providing a vertically oriented and continuous perimeter of contact for the joint between said head tube and said spine tube, said control cable entrance port substantially aligned to project rearwardly through the area within the perimeter of the joint between said head tube and said spine tube.

9. A bicycle frame in accordance with claim 1, the frame having means to guide a rear brake cable through and out of the interior of the frame, said means rearwardly locating the path of a rear brake cable extending rearwardly and downwardly from a control cable entrance port at the front of the frame, said means then providing a cable passage through a bottom wall portion of the frame, said cable passage laterally located substantially along the center of the frame, said means providing a substantially straight cable path within, and out of the frame, said means providing substantial alignment between the projected centerline of the control cable entrance port, the cable path within the frame, the cable passage through the bottom wall portion of the frame, and a centerpull type rear brake installed on the frame.

10. In a bicycle frame having a head tube portion joined with the forward end of a spine tube portion, the head tube portion in substantially perpendicular alignment with the spine tube portion, the head tube portion having an upper end bore aligned with a lower end bore, the bores to accept respective upper and lower headset bearings, the headset bearings to rotatably mount the steering tube of a front wheel fork, the bicycle steering axis passing through the centers of the upper and lower bores, the improvement wherein at least one control cable entrance port is located through the wall of the head tube portion, said port intersecting that outer surface of the head tube portion which is ahead of the steering axis, the centerline of said port oriented in substantial parallel alignment with the spine tube portion, the rearwardly projected centerline of said port laterally offset from the steering axis by a distance greater than the outside radius of the steering tube, the rearwardly projected centerline of said port intersecting the annular clearance between the inside wall of the head tube portion and the outside wall of the steering tube, the centerline of said port projecting rearwardly into the interior of the spine tube portion, thereby providing a bend-free cable path into and along the interior of the spine tube portion of the frame.

11. A bicycle frame in accordance with claim 10, the frame further comprising a rear wheel stay joined in substantially parallel alignment with the spine tube portion of the frame, the forward end of the stay joined with the rearward end of the spine tube portion, the rearward portion of the stay joined with such support structure as a dropout to carry an end of a rear wheel axle, a passage provided for an internal cable extending back from the front of the frame, said passage between the interior of the spine tube portion and the interior of the stay, a cable exit port located through the rearward end of the stay, the centerline of said exit port in substantially parallel alignment with the central axis of the rearward portion of the stay, an installed cable exiting the frame through said cable exit port, thereby providing for such component as a rear derailleur, a short and direct internal cable path with minimal bending of the cable.

* * * * *